No. 657,207. Patented Sept. 4, 1900.
G. A. WASHBURN.
APPARATUS FOR CURING MEAT.
(Application filed Aug. 18, 1898.)
(No Model.) 2 Sheets—Sheet 1.

Witnesses.
E. B. Gilchrist
Philip F. Knowlton

Inventor,
George A. Washburn,
By his Attorneys,
Thurston & Bates

No. 657,207. Patented Sept. 4, 1900.
G. A. WASHBURN.
APPARATUS FOR CURING MEAT.
(Application filed Aug. 18, 1898.)

(No Model.) 2 Sheets—Sheet 2.

Witnesses:
E. B. Gilchrist
Philip E. Knowlton

Inventor:
George A. Washburn,
By his Attorneys,
Thurston & Bates.

UNITED STATES PATENT OFFICE.

GEORGE A. WASHBURN, OF CLEVELAND, OHIO, ASSIGNOR TO B. B. QUINN, TRUSTEE, OF SAME PLACE.

APPARATUS FOR CURING MEAT.

SPECIFICATION forming part of Letters Patent No. 657,207, dated September 4, 1900.

Application filed August 18, 1898. Serial No. 688,943. (No model.)

*To all whom it may concern:*

Be it known that I, GEORGE A. WASHBURN, a citizen of the United States, residing at Cleveland, in the county of Cuyahoga and State of Ohio, have invented a certain new and useful Improvement in Apparatus for Curing Meat, of which the following is a full, clear, and exact description, reference being had to the accompanying drawings.

The chief object of my invention is to cure meat in brine or analogous curing liquids in less time than is required by means heretofore employed for the purpose.

The invention consists of an apparatus which comprises, essentially, a vessel to contain a curing solution, means for causing a circulation of the solution, electrodes and electrical connections, and means for protecting the curing solution from contamination by the detritus of the operation.

The process carried out by the apparatus of this application has in compliance with a requirement been made the subject of a divisional application, Serial No. 728,227, filed August 23, 1899.

Figure 1:
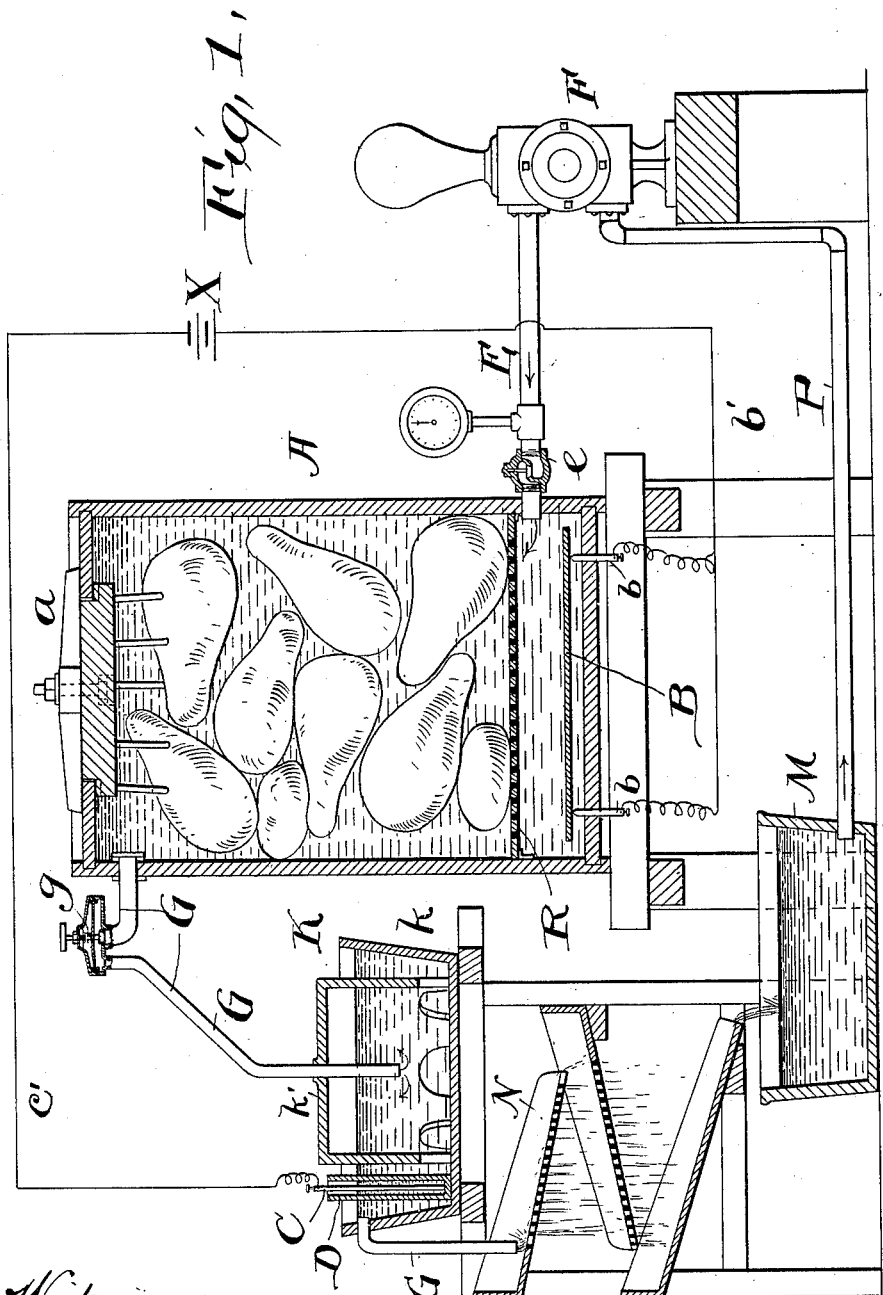
Figure 2:
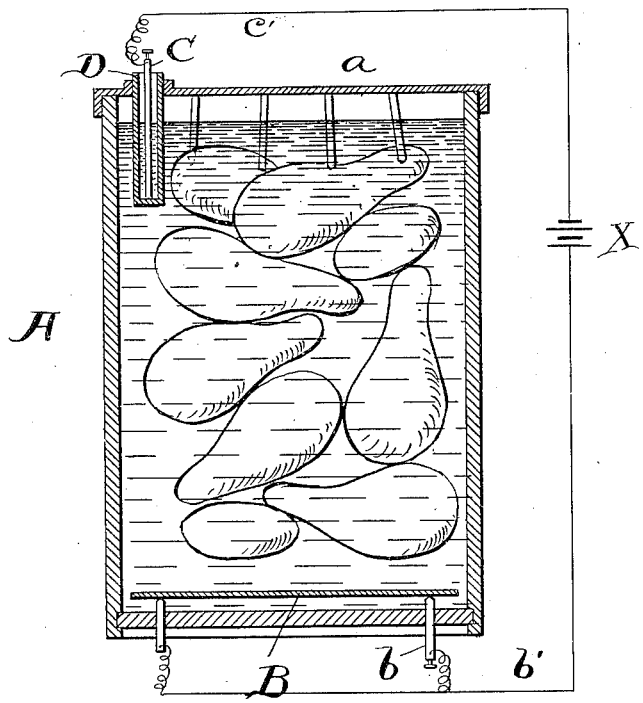

In the drawings, Figure 1 represents a side elevation, partly in section. Fig. 2 is a modified apparatus capable of being used for the practice of a process embodying some, but not all, of the novel operations.

Meat is placed in a vat A and covered with brine or other suitable curing liquid. This vat may be made of any suitable size and shape. It ought, however, to be made of or lined with some insulating material which will not be disintegrated by the curing fluid or by the electrolytic action. It may, for example, be made of wood or of metal having a so-called "porcelain" or other vitreous lining. An electric current is then caused to flow through the curing fluid between two electrodes B and C. The negative electrode B may be a carbon plate placed in the vat near the bottom thereof, resting upon short screws or pins $b$, of which one or more may be extended through the bottom of the vat and serve as binding-posts for the attachment of the circuit-wire $b'$. The positive electrode C may also be made of carbon; but it must not be placed in brine, because, first, if it were the solution would be decomposed by the electrolytic action and chlorine gas would be liberated at this electrode. This chlorine gas would contaminate the brine and the meat being cured therein, and it would at the same time make a stifling and offensive odor in the room. Second, the electrode itself will be disintegrated, and if it were immersed in the brine the minute particles of carbon would get into the meat and soon spoil it. To prevent the described injurious action which would follow the immersion of the positive electrode in the brine, said electrode is placed in a clay porous cup D or some analogous receptacle containing water, and the cup sets in the brine at such point relative to the negative electrode that the electric current flowing from one electrode to the other will be obliged to pass through as much of the brine in which the meat is immersed as possible.

With an apparatus having the characteristics above described an electric current, derived from any suitable generator, (indicated at X,) may be passed through the curing liquid without generating any appreciable chlorine gas at the positive electrode, such small amount as is generated, however, being generated in the porous cup, from which it passes off without contaminating the brine. Moreover, the minute particles of carbon which result from the disintegration of the electrode are held in the cup and do not contaminate the brine.

In Fig. 2 is shown an apparatus having the parts above named with which one may practice the process, as above described.

The action of the electric current seems to be to open up the pores of the meat, whereby the brine penetrates the meat with great rapidity, with the result that the meat will be cured in a fraction of the time which would be necessary except for the employment, substantially as described, of the electric current.

Although it is believed that the procedure as heretofore described is a great improvement upon the old procedure, better results are obtained and the meat may be cured in a very much shorter time if in addition to employing the electric current, as described, the brine is caused to circulate through the vat A, preferably under pressure. In fact, with the process including the employment of the electric current as described and the circulation of the curing liquid under pressure, meat which requires from seventy to ninety days for curing by the old processes may be cured in as many hours or less.

For the practice of the complete process an apparatus substantially as shown in Fig. 1 may be employed.

The vat A is provided with a cover $a$, which may be tightly closed. Near the bottom of the vat a perforated partition R is secured, and below this partition is an inlet-pipe E, which is connected with a pump F of any suitable construction. In the pipe E is a check-valve $e$, of any suitable construction, adapted to prevent back pressure. The outlet-pipe G, which is connected with the vat A, near the top thereof, discharges into a supplemental tank K and contains pressure-regulating valve $g$ of any approved construction. This supplemental tank consists, as shown, of the outer receptacle $k$ and an inverted inner receptacle $k'$, which has openings near its lower edge for establishing free communication between the inner and outer receptacles. The outlet-pipe extends down and discharges into the inner receptacle, the fluid passing therefrom into the outer receptacle, from which it overflows into the pipe G. The chief reason for employing a supplemental tank having the inverted inner receptacle into which the pipe G discharges is to prevent the incoming brine from unduly agitating the brine in the receptacle, whereby it might slop over the sides of or into the porous cup, and also to prevent the accumulation of considerable quanty of foam, which would be formed in large quantities if the brine were discharged from the pipe G into an open receptacle. The porous cup D, containing the positive electrode C, sits in the outer receptacle $k$ where the brine does not rise above the opening of the overflow-pipe G. It is desirable that this supplemental tank and all parts of the outlet-pipe G and its connections with which the brine comes into contact shall be made of material which will not be disintegrated or corroded by the electrolytic action or by the brine, because thereby all danger that the brine will be contaminated, and by it the meat, is avoided. The tank may be made of wood and the outlet-pipe of rubber hose, except the fittings and valve, which may be made of gutta-percha or any other analogous substance. It is not, perhaps, absolutely essential that the parts referred to be made of such material as is mentioned, but certainly much better results are reached when they are. The meat is undoubtedly sweeter, and all electrodeposition which might impair the usefulness of the electrical apparatus is prevented. A suction-tank M is also provided and the suction-pipe P of the pump is connected with it. The brine in the supplemental tank K discharges through the outlet-pipe G onto the first of a series of inclined plates or pans N, which are preferably perforated, and the brine flows down one onto the one next beneath it, and so on, finally discharging into the suction-tank. These plates are provided for the purpose of breaking the column of the brine, and thereby making it impossible for the electric current to flow between the two electrodes by way of the suction-pipe, pump, and inlet-pipe E.

In operating the apparatus the brine is pumped from the suction-tank into the vat A under pressure. It has been found that a pressure of from twenty to twenty-five pounds is a suitable pressure, but I do not intend to limit the invention to any particular pressure. The brine passes from the vat A into the supplemental tank K through pipe G, in which pipe there will be at all times a continuous column of the brine. The current from the generator passes over the wires $b'$ and $c'$ and between the electrodes B and C through the brine in the vat A, pipe G, and tank K. An electrical current of one ampere and ten volts is a suitable current, but I do not intend to limit the scope of the claims to an electric current of any particular voltage or amperage. Because the column of brine is broken between the supplemental tank K and the suction-tank M the current does not pass through said suction-tank and the connection between it and the vat. It is therefore possible without endangering the success of the process to construct these parts of iron or any other metal desired.

As before stated, a process substantially as described employing the electric current in the manner stated and without circulating the brine will cure meat in a small fraction of the time which has heretofore been necessary for the purpose. The circulation of the brine through the vat A greatly reduces this time. The circulation of the brine under pressure effects a still further reduction of time. In other words, the employment of the electrical current in the manner described is the fundamental step of the process, and each of the other steps are in the nature of additions thereto and improvements thereon, as set forth in my divisional application before noted.

In addition to the saving of time the use of the described apparatus and the practice of the process produces other good results, namely: none of the nutritious ingredients of the meat are lost, but all are retained, wherefore the meat does not lose weight during the curing operation, but, on the contrary, slightly gains in weight, due to the injection of salt into the same. Moreover, the rapidity with which the curing is effected causes the salt to be distributed evenly throughout the meat, whereas owing to the long time the meat is in the curing-vats in the old processes the meat near the surface contains more salt than does that farther from the surface, wherefore it is often necessary to soak out some of the salt deposited in the meat near its surface before said meat is ready for sale or use.

It will be understood from the foregoing description that the chief functions of the porous cup are to prevent both the disintegrated particles of the positive electrode and the gas generated at said electrode from entering the curing solution. A clay porous cup is the most convenient device for effecting these results; but any other device capable of effecting these two results should be regarded as the equivalent of the specific thing shown—viz., a porous cup—and is intended to be so regarded in measuring the scope of the claims.

Having described my invention, I claim—

1. In an apparatus for curing meat and the like, the combination of a vessel to contain the meat and a curing solution, electrodes and electrical connections including the solution, means for causing a circulation of the solution in the circuit and means for protecting the curing solution from contamination by the disintegration of the positive electrode.

2. In an apparatus for curing meat and the like, the combination of a vessel to contain the meat and a curing solution, means for causing a continuous circulation of the solution through the vessel, electrodes and electrical connections including the solution in the circuit, and means for protecting the curing solution from contamination by the disintegration of the positive electrode.

3. In an apparatus for curing meat and the like, the combination of a vessel to contain the meat and a curing solution, means for causing a circulation of the solution under pressure, electrodes and electrical connections including the solution in the circuit, and a protecting-container surrounding the anode.

4. In an apparatus for curing meat and the like, the combination of a vessel to contain the meat and a curing solution, means for causing a circulation of the solution, electrodes and electrical connections including the solution in the circuit, a supplementary tank through which the curing solution passes, and a protecting-container in the supplementary tank surrounding the anode.

5. In an apparatus for curing meat and the like, a vat adapted to contain the meat and a curing solution and mechanism for causing the continuous circulation of the solution through said vat, combined with a negative electrode submerged in the solution, a porous cup which sits in the solution, a positive electrode in said porous cup, an electric generator and electrical connections between said generator and electrodes, substantially as specified.

6. In an apparatus for curing meat and the like, the combination of a vessel to contain the meat and a curing solution, having an inlet and an outlet opening, an external fluid-conductor connected with the said openings, means for inducing the circulation of a curing solution through the vessel and through the fluid-conductor, an electrode in the vessel submerged in the curing solution, a porous container submerged in the solution, an electrode in the porous container and electric connections and an electric generator, substantially as described.

7. In an apparatus for curing meat and the like, the combination with a vessel for containing the meat and a curing solution, having an inlet and an outlet opening, a negative electrode in the vessel, an external fluid-conductor connected with the said openings comprising means for breaking the continuity of the column of the fluid, a pump connected with the fluid-conductor on one side of the break, a porous container immersed in the curing solution on the opposite side of the break, a positive electrode in the porous container, electric connections and an electric generator, substantially as described.

8. In an apparatus for curing meat, a vat containing a curing solution and adapted to contain the meat to be cured, combined with a negative electrode submerged in said solution, a porous cup which sets in the solution, a positive electrode in said porous cup, an electric generator, and electrical connections between said generator and electrodes, substantially as specified.

9. In an apparatus for curing meat, the combination of a vat adapted to be tightly closed, and a supplemental tank, with means for causing a curing solution to circulate through said vat and thence to the supplemental tank and back into the vat, a plate constituting a negative electrode in said vat, a porous cup sitting in the supplemental tank, a plate constituting a positive electrode contained in said cup, an electrical generator, and electrical connections between said generator and electrodes, substantially as specified.

10. In an apparatus for curing meat, the combination of a vat adapted to be closed tightly and made of or lined with insulating material which will not be disintegrated by the curing solution or by the electrolytic action, an outlet-pipe near the upper end of said vat, and a supplemental tank into which said pipe discharges; said tank and pipe being made of material which will not be disintegrated by the curing solution or the electrolytic action, with a negative electrode contained in the vat near the lower end thereof, a porous cup sitting in the supplemental tank, a positive electrode in said porous cup, an electric generator, electrical connections between the generator and said electrodes, a pump, a pipe connecting the same to the vat near its lower end, means for conducting the curing solution from the supplemental tank, in a broken column, to the pump, and a curing solution contained in the parts named, substantially as specified.

11. In an apparatus for curing meat, the combination of a vat having a perforated partition near its lower end and adapted to be tightly closed, an outlet-pipe near its upper end, a supplemental tank into which the said outlet-pipe discharges, a pump, a pipe connecting the pump with the vat at a point below the perforated partition, and means for conducting the curing solution from the supplemental tank to the pump in a broken column, with a negative electrode contained in the vat below the perforated partition, a porous cup sitting in the supplemental tank, a positive electrode in said porous cup, and connections between said electrodes and a suitable generator, substantially as specified.

12. In an apparatus for curing meat, the combination of a vat adapted to be tightly closed, and having suitable inlet and outlet pipes at opposite extremities, a pump connected with the inlet-pipe, a supplemental tank consisting of an outer receptacle having an outlet-pipe, and an inverted inner receptacle into which the outlet-pipe of the vat discharges, there being free communication between this inner receptacle and the outer receptacle, with means for conducting the curing fluid from the outer receptacle of said supplemental tank to the pump, with a negative electrode submerged in the vat, a porous cup sitting in the outer receptacle of the supplemental tank, a positive electrode in said porous cup, and electrical connections between said electrodes and a suitable generator, substantially as specified.

13. In an apparatus for curing meat, the combination of a vat adapted to be tightly closed, having an inlet-pipe near its lower end and an outlet-pipe near its upper end, a supplemental tank into which said pipe discharges, a negative electrode contained in the vat, a porous cup sitting in said supplemental receptacle, a positive electrode in said porous cup, an electric connection between said electrodes and a suitable generator, with a series of oppositely-inclined plates arranged one below the other, over which the fluid discharged from the supplemental tank successively flows, a suction-tank into which the lower of said plates discharges, a pipe from said suction-tank, and a pump connected with said pipe and with the inlet-pipe to the vat, substantially as specified.

14. In an apparatus for curing meat, the combination of a vat, adapted to be tightly closed, having an inlet-pipe and an outlet-pipe at opposite extremities of the vat, the outlet-pipe containing the pressure-regulating valve, and a supplemental tank into which said outlet-pipe discharges—said vat, outlet-pipe and supplemental tank, being made of or lined with insulating material—a negative electrode in the vat, a porous cup in the supplemental tank, a positive electrode in said porous cup, and electrical connections between said electrodes and a suitable generator, with a series of oppositely-inclined plates arranged to discharge one upon another, an outlet-pipe to the supplemental tank discharging onto the upper of said plates, a suction-tank into which the lower of said plates discharges, a suction-pipe connected with said tank, and a pump connected with said suction-pipe and with the inlet-pipe to the vat, substantially as specified.

In testimony whereof I hereunto affix my signature in the presence of two witnesses.

GEORGE A. WASHBURN.

Witnesses:
PHILIP E. KNOWLTON,
E. L. THURSTON.